(12) United States Patent
Sami

(10) Patent No.: US 10,975,526 B2
(45) Date of Patent: Apr. 13, 2021

(54) LINEAR ACTUATOR FOR RAIL APPLICATIONS

(71) Applicant: HARSCO TECHNOLOGIES LLC, Fairmont, MN (US)

(72) Inventor: Syed Reza Sami, West Columbia, SC (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 435 days.

(21) Appl. No.: 15/955,472

(22) Filed: Apr. 17, 2018

(65) Prior Publication Data

US 2018/0298563 A1 Oct. 18, 2018

Related U.S. Application Data

(60) Provisional application No. 62/486,845, filed on Apr. 18, 2017.

(51) Int. Cl.
| | | |
|---|---|---|
| *E01B 27/16* | (2006.01) | |
| *H02K 33/00* | (2006.01) | |
| *E01B 27/20* | (2006.01) | |
| *H02K 33/16* | (2006.01) | |

(52) U.S. Cl.
CPC .............. *E01B 27/16* (2013.01); *E01B 27/20* (2013.01); *H02K 33/00* (2013.01); *H02K 33/16* (2013.01); *E01B 2203/127* (2013.01)

(58) Field of Classification Search
CPC .......... E01B 27/16; E01B 27/20; E01B 27/11; H02K 33/00; H02K 41/02; B62B 19/28; B06B 1/04; F16F 15/03
See application file for complete search history.

(56) References Cited

U.S. PATENT DOCUMENTS

| | | | | |
|---|---|---|---|---|
| 5,440,183 | A * | 8/1995 | Denne | F15B 15/00 |
| | | | | 310/12.26 |
| 2007/0023244 | A1* | 2/2007 | Carlson | B60N 2/522 |
| | | | | 188/267 |
| 2017/0019012 | A1* | 1/2017 | Sami | E01B 27/16 |
| 2018/0235000 | A1* | 8/2018 | Damnjanovic | H04W 74/006 |
| 2018/0298563 | A1* | 10/2018 | Sami | H02K 33/00 |

FOREIGN PATENT DOCUMENTS

| | | |
|---|---|---|
| JP | 08-060601 A | 3/1996 |
| JP | 2007-506539 A | 3/2007 |

OTHER PUBLICATIONS

International Search Report and Written Opinion in connection with PCT/US2018/027996 dated Aug. 8, 2018.

* cited by examiner

*Primary Examiner* — Jason C Smith
(74) *Attorney, Agent, or Firm* — Norton Rose Fulbright US LLP

(57) ABSTRACT

A rail maintenance vehicle includes a frame, a workhead, and a vibration unit. The frame includes wheels that travel along rails. The vibration unit includes a rod member having a coil assembly coupled thereto. The vibration unit further includes a core assembly operable to receive the rod member therein. The core assembly includes a plurality of magnet members disposed along the periphery of the core assembly. The coil assembly and magnet members are operable to impart linear motion to the rod member relative to the core assembly.

24 Claims, 7 Drawing Sheets

LINEAR ACTUATOR FOR RAIL APPLICATIONS

CROSS-REFERENCE TO RELATED APPLICATIONS

This application claims priority to U.S. Provisional App. Ser. No. 62/486,845 filed on Apr. 18, 2017, which is hereby incorporated by reference in its entirety.

BACKGROUND

Generally, railroad tracks include a pair of parallel rails coupled to a series of laterally extending ties (or sleepers). Ties may be made from concrete or wood. Each tie is coupled to the rails by metal tie plates and/or spring clips. The ties are disposed on a ballast bed. The ballast may be a hard particulate material, such as gravel. The ballast filled space between the ties is called a crib.

Although appearing rigid, rails are flexible members that can bend and distort, for example under the load of trains passing over. The ballast acts like a cushion absorbing some of the shock. Ballast can also help keep the rail level and allow moisture and rain water to drain away.

During installation and maintenance, ballast may be "tamped" to maintain proper position of the ties. Tamping involves agitating the ballast to allow the particles to reposition, and compact it under the tie. Tampers may also include track stabilizer workheads for applying pressure to a track structure. Additional maintenance procedures may also require actuation of workheads extending from the rail vehicle.

Rail maintenance devices, such as a tamping device, include one or more workheads mounted on a motorized vehicle that travels on the rails. A workhead may include a pair of elongated, vertically extending tools structured to move together vertically and horizontally. In the tamping context, such workheads cooperate to move together in a pincer-like motion. The workhead may have two sets of tools spaced so that each tool may be disposed on opposite lateral sides of a rail. The workhead may further include a vibration device configured to rapidly vibrate the tools.

The vibration device is generally a hydraulic actuator, which may require many components to drive such as hoses, hydraulic circuit pumps, tanks and filters. Moving parts in the hydraulic systems may wear and fail. The hydraulic systems may also leak requiring work stoppage for maintenance. A linear actuator vibrator that achieves a linear actuator-vibrator function, thus achieving both linear motion and vibration motion with high acceleration, velocity and force would be advantageous.

BRIEF SUMMARY

In an embodiment, a rail maintenance vehicle includes a frame, a workhead, and a vibration unit. The frame includes wheels that travel along rails. The vibration unit takes the form of a linear actuator vibrator that includes a rod member having a coil assembly coupled thereto, and a core assembly. The core assembly includes a plurality of magnet members. The rod member is adapted for insertion into the core assembly, such that the coil assembly cooperates with the magnet members to achieve vibratory motion.

In another embodiment, a vibration unit or linear actuator vibrator for use with a rail vehicle or other machinery includes a rod member having a coil assembly coupled thereto, a core assembly and a controller. The core assembly includes a plurality of magnet members. The rod member is adapted for insertion into the core assembly, such that the coil assembly cooperates with the magnet members to achieve vibratory motion. The controller is operable to pulse current flow to cause the rod member to move linearly and thus produce vibratory motion.

DETAILED DESCRIPTION

Embodiments of a linear actuator vibrator and related methods for applying linear actuation and vibration to a work head in a rail vehicle are described. It is to be understood, however, that the following explanation is merely exemplary in describing the devices and methods of the present disclosure. Accordingly, any number of reasonable and foreseeable modifications, changes, and/or substitutions are contemplated without departing from the spirit and scope of the present disclosure.

Figure 1A:
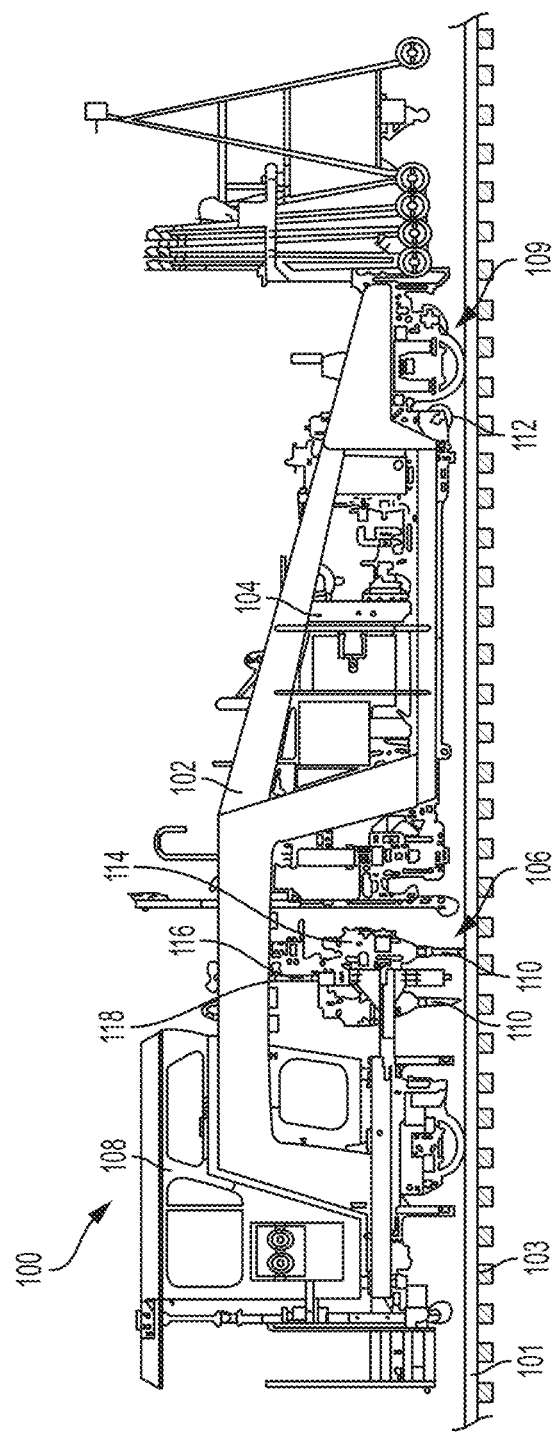
FIG. 1A shows a tamping machine rail vehicle where a linear actuator vibrator unit can be implemented, according to an example embodiment.

In an embodiment, the linear actuator vibrator according to the present disclosure is employed in a tamping machine rail vehicle, as illustrated in FIG. 1A. It is to be appreciate that the linear actuator vibrator of the present disclosure may be employed in a variety of rail vehicles, including manned or drone rail maintenance vehicles. FIG. 1A shows a tamping vehicle 100 that includes a frame assembly 102, a propulsion device 104, a tamping device 106, and a cabin 108. In drone embodiments, cabin 108 may be removed.

Frame assembly 102 includes a plurality of rigid frame members and a plurality of wheels 109 that are configured to travel on the pair of rails 101. Tamping vehicle 100 travels across a pair of rails 101, disposed over a series of rail ties 103. The rails 101 and series of ties 103 are disposed over a bed of ballast. The propulsion system 104 is configured to move tamping vehicle 100. The tamping device 106 is configured to tamp rail ties 103.

The tamping device 106 may include multiple workheads. In the side view of FIG. 1A, one workhead can be viewed while another workhead is also included at an opposite side corresponding with the other rail. Any number of workheads (2, 4, etc) may be included.

Figure 1B:
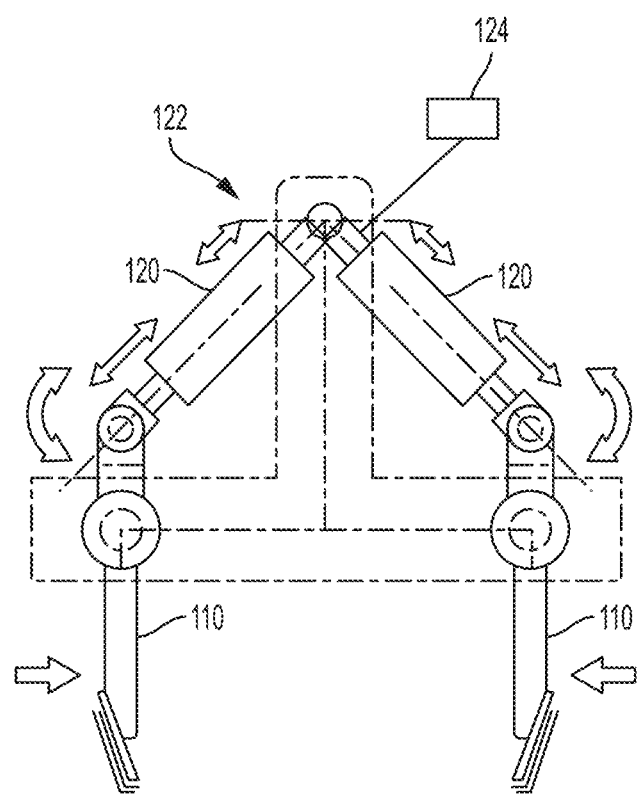
FIG. 1B shows an exemplary workhead unit according to the principles of the present disclosure.

Referring to FIG. 1B, an exemplary workhead unit 122 may employ a linear actuator vibrator 120 according to the present disclosure. A pair of linear actuator vibrators 120 may be coupled to paddles 110 that form part of the tamping device 106 (collectively, the workhead). The paddles 110 are adapted to be lowered into the ballast. The paddles 110 are vibrated by the linear actuator vibrators 120 to squeeze the paddles around the rail ties. A controller 124 may be electrically coupled to the pair of linear actuator vibrators 120 to selectively provide current flow as will be described. In some embodiments, each linear actuator vibrator 120 has a corresponding controller 124. While the controller 124 is depicted as being located proximal to the linear actuator vibrators 120, in practice, the controller 124 or controllers 124 may be positioned remote from the workhead unit 122.

Referring again to FIG. 1A, the tamping device 106 is coupled to the frame assembly 102 via a subframe 116 and an actuator 118. The actuator 118 is preferably a hydraulic actuator and is operable to lower the tamping device 106 such that the paddles 110 are inserted into the ballast where the squeezing and vibration action tamps the ballast. In a work cycle, the tamping vehicle 100 advances to position the tamping device 106 over a tie. The actuator 118 is actuated to lower the tamping device 106 to carry out the tamping of the ballast by actuation of the linear actuator vibrators 120. Then, the actuator 118 is actuated to raise (and in some cases stow) the tamping device 106 for travel to the next tie.

Figure 2B:
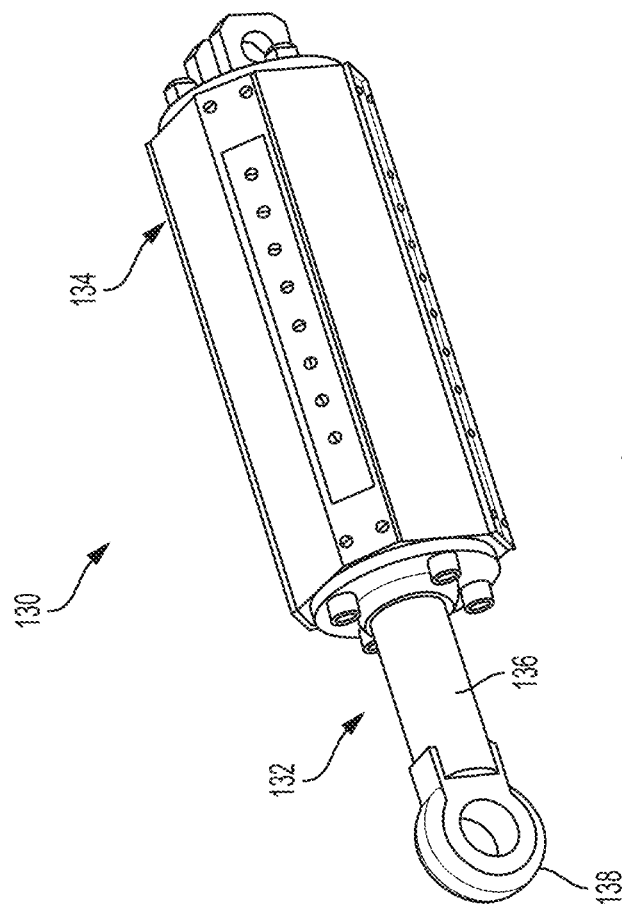
FIG. 2B shows an isometric view of a linear actuator vibrator in an extended position.
Figure 2A:
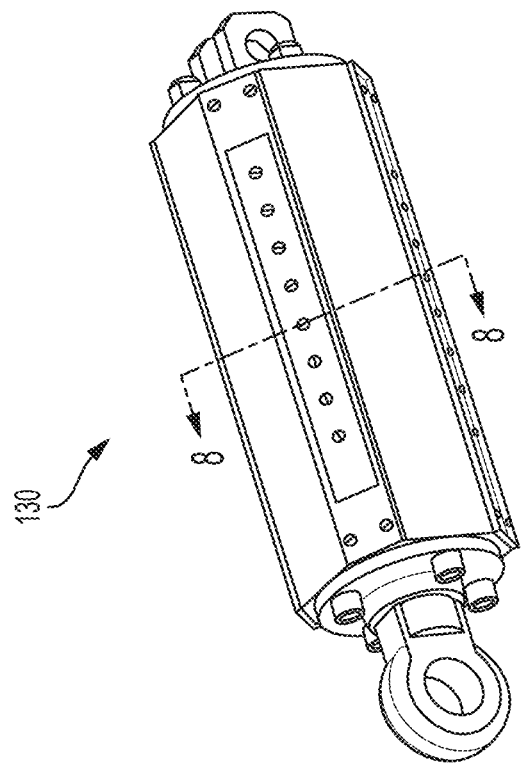
FIG. 2A shows an isometric view of a linear actuator vibrator.
Figure 3:
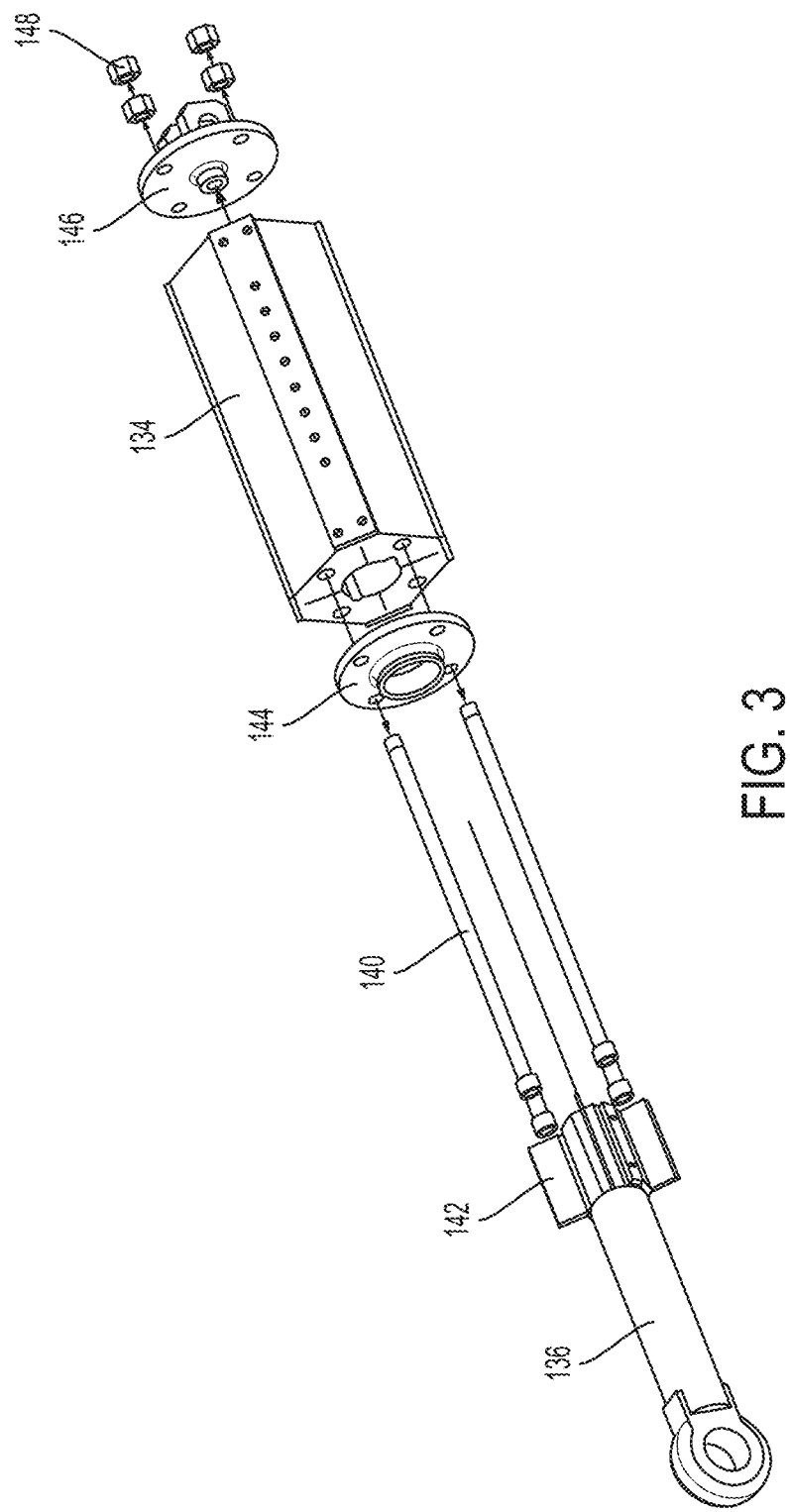
FIG. 3 shows an exploded isometric view of the linear actuator vibrator of FIGS. 2A and 2B.

FIGS. 2A and 2B show a vibration unit 130 that may be employed as the linear actuator vibrator 120 described above. The vibration unit 130, which may also be referred to as a linear actuator vibrator, may take the form of a frameless linear motor or "ironless" actuator that achieves a linear actuator-vibrator function, thus achieving both linear motion and vibration motion with high acceleration, velocity and force.

With reference to FIGS. 2-8, the linear actuator vibrator 130 includes a rod assembly 132 and a core assembly 134. The rod assembly 132 includes an actuator rod (rod member) 136 with a coupling 138 disposed at a distal end thereof. The coupling 138 may be used to couple the linear actuator vibrator 130 to a frame or workhead unit of a rail vehicle, such as rail vehicle 100. The rod assembly 132 is adapted for connection to a pair of tie rods 140, which in turn are adapted for insertion into the core assembly 134. The rod assembly 132 further includes a coil assembly 142 coupled to the rod 136 as will be further described.

The core assembly 134 includes a cover plate 144, which functions as a guide bearing to guide the rod assembly 132 into the core assembly. The distal end of the core assembly 134 includes a coupling 146, such as a clevis device, for adhering the core assembly to the rail vehicle. In this regard, the clevis device 146 includes one or more locking devices 148, such as lock nuts for coupling the core assembly to the rail vehicle.

Figure 5:
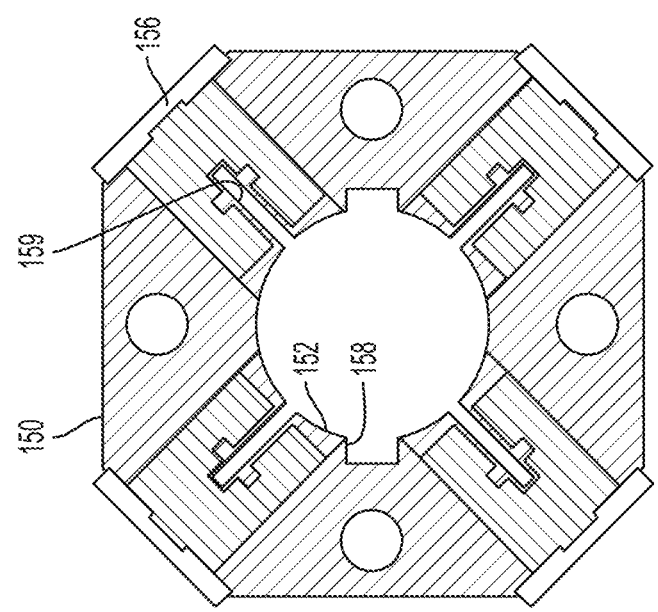
FIG. 5 shows a cutaway view of the core assembly of FIG. 4
Figure 4:
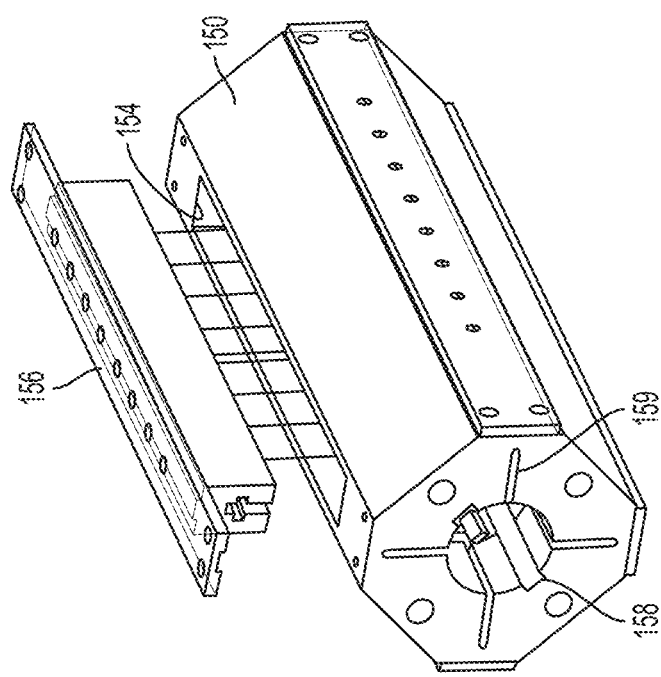
FIG. 4 shows an exploded isometric view of a core assembly of the linear actuator vibrator of FIGS. 2A and 2B.

Referring more specifically to FIGS. 4 and 5, the core assembly 134 includes a frame member 150, which may be formed of a variety of materials, such as aluminum or polymer. The core assembly 134 includes a bore 152 defined therein that runs longitudinally through the core assembly. The core assembly 134 also includes a plurality of slots 154 defined along the periphery of the core assembly to accommodate a plurality of magnet members 156. In one embodiment, the core assembly 134 includes four magnet members 156 disposed substantially concentrically about the core assembly. The core assembly 134 further includes a pair of guideways 158 defined therein and adjacent to the bore 152. A plurality of channels 159 are also defined in the core assembly 134 to accommodate the coil assembly 142 as will be described.

Figure 7:
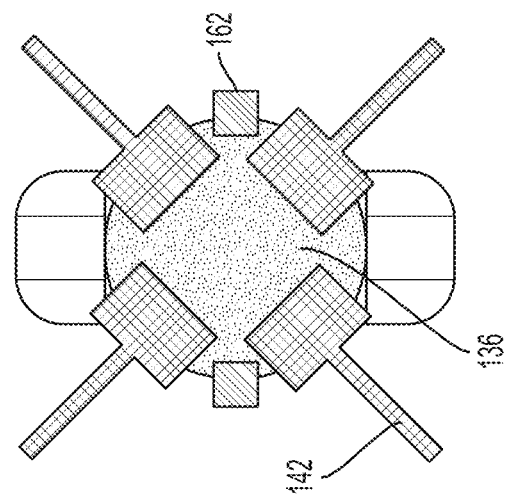
FIG. 7 shows a front schematic view of the rod assembly of FIG. 6.
Figure 6:
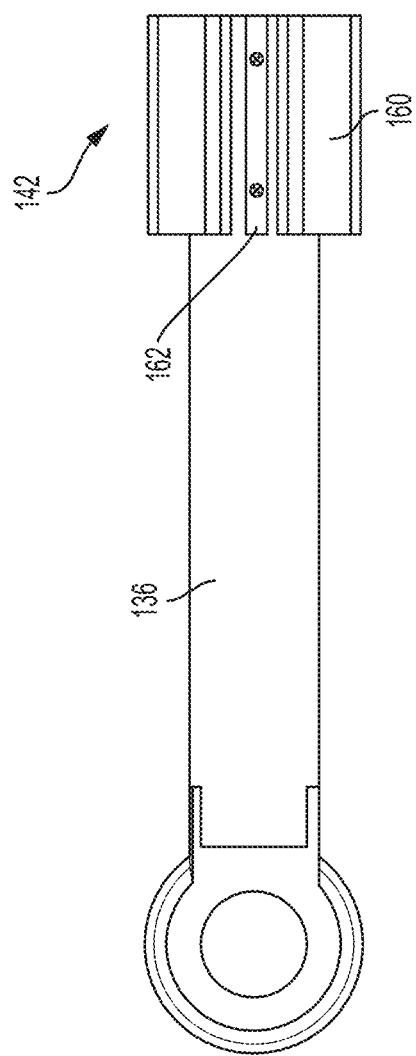
FIG. 6 shows a front view of a rod assembly of the linear actuator vibrator of FIGS. 2A and 2B.

With specific reference to FIGS. 6 and 7, in one embodiment, the coil assembly 142 is disposed at a distal end of the actuator rod 136 and is comprised of four coils 160 that are disposed in grooves defined in the actuator rod. The coils 160 extend laterally outward from the actuator rod 136 and are sized and shaped to be received within the channels 159 defined in the core assembly 134. A pair of guide bars 162 are also coupled to the actuator rod 136 to facilitate alignment of the rod assembly 132 as it is inserted into the core assembly 134. In that regard, the guide bars 162 are sized and shaped for insertion into the guideways 158 defined in the core assembly 134.

Figure 8:
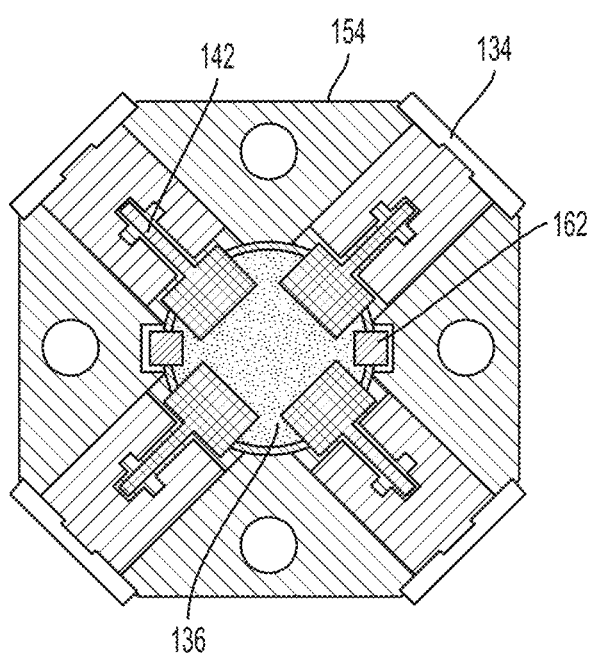
FIG. 8 shows a front schematic view of the rod and core assembly of FIGS. 4 and 7.

With reference to FIG. 8, when the rod assembly 132 is inserted into the core assembly 134, the coils 160 are disposed in the channels 159 and the actuator rod 136 is disposed in the bore 152. The guide bars 162 are disposed in the guideways 158.

In practice, the linear actuator vibrator 130 may be actuated to achieve both linear motion and vibration simultaneously. For example, the controller 124 (FIG. 1B) may provide current flow to the coil assembly 142, which energizes the coils 160 to achieve linear motion of the rod assembly 132. Such linear motion is at a right angle to the flow of current and magnetic field, and thus reversing the current flow (polarity) results in reverse motion. In this manner, reciprocal or oscillating motion of the rod member 136, and thus rod assembly 132, occurs relative to the core assembly 134. It is to be appreciated that the controller 124 may output two signals simultaneously—(1) a squeeze signal which linearly actuates the rod assembly 132, causing it to travel forward and thus impart a squeezing motion to the workhead to squeeze ballast, and (2) a vibrating signal to impart vibration to the workhead. The controller may then output a signal to reverse the motion of the rod assembly, returning it to its previous position and thus opening the workhead (paddles 110) in preparation for the next cycle.

Such linear motion and vibration may be used to actuate tools, such as the paddles 110 described with reference to FIG. 1A. In some embodiments, the use of multiple coils 160 in parallel achieves a linear thrust of up to 80 kN and vibration in the range of 35-50 Hz. Of course, these measurements are only exemplary and, in some embodiments, additional thrust or vibration may be achieved. In some embodiments, the linear actuator vibrators 120 are driven by a servo drive, such as one provided by the controller 124, and thus sensors may be deployed to provide feedback to have variable amplitude reciprocal linear vibrations.

It will be appreciated that this disclosure is not limited to rail vehicles that perform tamping operations. For example, any rail operation that can benefit from linear thrust and vibration can also realize advantages of the present disclosure. It will further be appreciated that this disclosure is not limited to rail vehicles and the disclosed linear actuator vibrator may be used in any application requiring thrust and vibration. For example, non-rail applications are contemplated, such as construction equipment like gravel packers, jack hammers, and so forth.

The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

The invention claimed is:

1. An apparatus for use with a rail maintenance vehicle, the apparatus comprising:
a workhead configured to be coupled to a rail vehicle; and
a vibration unit coupled to the workhead, the vibration unit including:
a rod member:
a coil assembly coupled to the rod member, the coil assembly comprising one or more coils; and
a core assembly configured to receive the rod member, the core assembly having a plurality of magnet members disposed along a periphery of the core assembly;
wherein the coil assembly and magnet members are configured to impart linear motion to the rod member relative to the core assembly.

2. The rail maintenance vehicle of claim 1, further comprising a controller electrically coupled to the vibration unit and configured to selectively apply current to the vibration unit.

3. The rail maintenance vehicle of claim 1, wherein the one or more coils includes four coils disposed about a distal end of the rod member.

4. The rail maintenance vehicle of claim 1, wherein the rod member includes a pair of guide bars disposed on opposing sides of a distal end of the rod member.

5. The rail maintenance vehicle of claim 1, wherein the core assembly comprises a frame member, the frame member having a plurality of slots defined along a periphery of the frame member for receiving the magnet members therein.

6. The rail maintenance vehicle of claim 1, wherein the core assembly comprises a frame member, the frame member having a plurality of channels defined therein for receiving the coil assembly.

7. A vibration unit, comprising:
a rod assembly comprising:
a rod; and
a coil assembly coupled to the rod; and
a core assembly configured to receive the rod, the core assembly including a plurality of magnet members disposed along a periphery of the core assembly;
wherein the coil assembly and magnet members are configured to impart linear motion to the rod relative to the core assembly.

8. The vibration unit of claim 7, further comprising a controller electrically coupled to the vibration unit for selectively applying current to the vibration unit.

9. The vibration unit of claim 7, wherein the coil assembly includes a plurality of coils disposed about a distal end of the rod.

10. The vibration unit of claim 7, wherein the rod includes a pair of guide bars disposed on opposing sides of a distal end of the rod.

11. The vibration unit of claim 7, wherein the core assembly comprises a frame member, the frame member defining a plurality of slots, each slot configured to receive a magnet member of the plurality of magnet members.

12. The vibration unit of claim 7, wherein the core assembly comprises a frame member, the frame member defining a plurality of channels for receiving the coil assembly, each channel configured to receive a coil of the coil assembly.

13. A method for imparting vibration to a workhead of a rail vehicle, comprising:
moving a rod member and a coil assembly of a rod assembly relative to a core assembly, the core assembly configured to receive the rod member and having a plurality of magnet members disposed along a periphery of the core assembly.

14. The method of claim 13, wherein moving the rod assembly relative to the core assembly comprises moving a plurality of coils of the coil assembly into a respective plurality of channels defined by the core assembly.

15. The method of claim 13, further comprising:
applying electrical current to a plurality of coils of the coil assembly to energize the coil assembly; and
producing a first magnetic field; and
wherein the first magnetic field is configured to move the rod assembly in a first direction.

16. The method of claim 15, further comprising:
reversing current flow to the plurality of coils; and
producing a second magnetic field; and
wherein the first magnetic field is configured to move the rod assembly in a second direction opposite the first direction.

17. A tool comprising:
a linear actuator configured to impart vibration in a workhead of a rail vehicle, the linear actuator comprising:
a piston assembly including:
a rod; and
a coil disposed on the rod; and
a magnetic housing defining:
a chamber configured to receive the rod; and
a channel configured to receive the coil;
wherein the coil is configured to produce a magnetic field to move the piston assembly relative to the magnetic housing.

18. The tool of claim 17, wherein the magnetic housing includes a magnet disposed on a periphery of the housing.

19. The tool of claim 18, wherein the magnetic housing defines a slot configured to receive the magnet such that the magnet is removable coupled to the magnetic housing.

20. The tool of claim 18, wherein:
the magnetic housing includes an end plate that defines a first portion of the channel; and
the magnet defines a second portion of the channel.

21. The tool of claim 17, further comprising a controller configured to:
produce a first magnetic field to impart linear movement of the piston assembly relative to the magnetic housing in a first direction; and produce a second magnetic field to impart linear movement of the piston assembly relative to the magnetic housing in a second direction that is opposite the first direction.

22. The tool of claim 17, wherein the coil includes a plurality of magnetic members disposed at a distal end of the rod, each magnetic member extending laterally outward from the rod such that the magnetic members are angularly disposed relative to each other.

23. The tool of claim 17, wherein the rod includes a guide bar disposed on a distal end of the rod.

24. The tool of claim 17, further comprising:
a tamping arm; and
wherein the linear actuator is coupled to the tamping arm such that movement of the piston assembly relative to the magnetic housing imparts vibration to the tamping arm.

* * * * *